Patented Aug. 6, 1929.

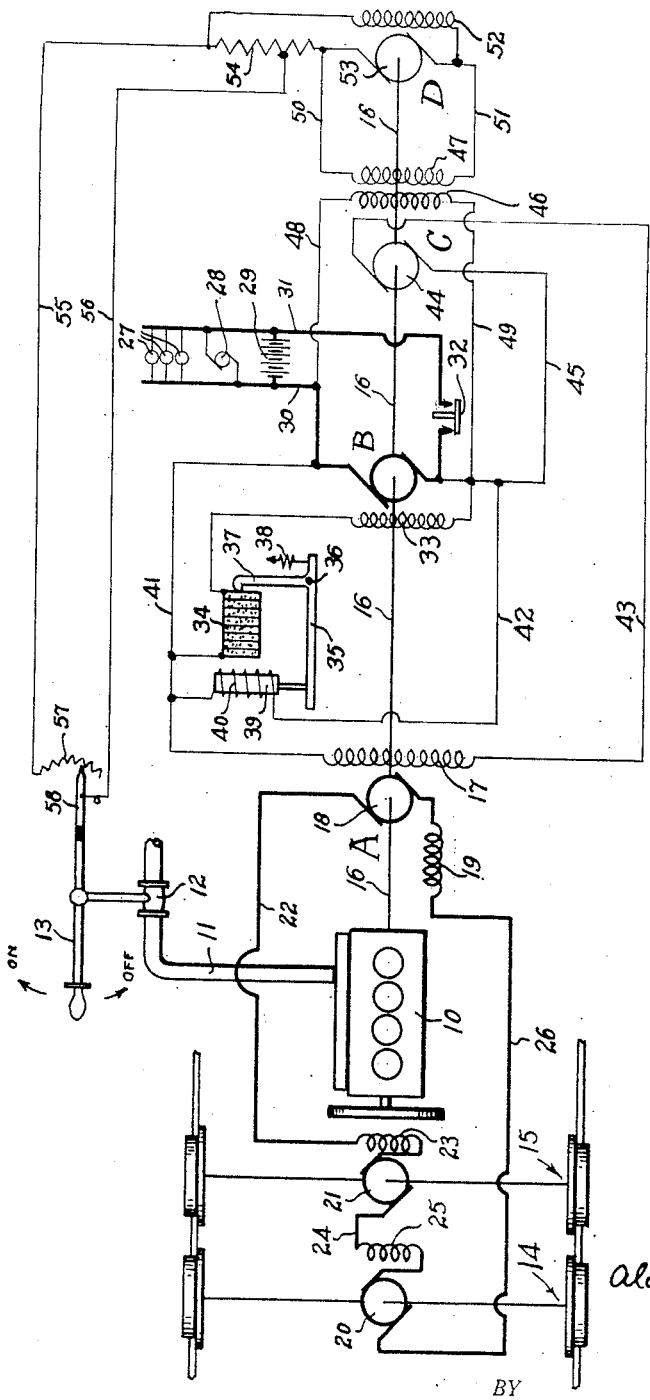

1,723,283

UNITED STATES PATENT OFFICE.

ALAN VARLEY LIVINGSTON, OF NEW HAVEN, CONNECTICUT, ASSIGNOR TO THE SAFETY CAR HEATING & LIGHTING COMPANY, A CORPORATION OF NEW JERSEY.

VEHICLE DRIVING APPARATUS AND SYSTEM.

Application filed April 11, 1925. Serial No. 22,378.

This invention relates to apparatus for transmitting power and, more particularly, to the transmission of power from a prime mover to the driving wheels or axles of a vehicle, such as a locomotive, for example.

One of the objects of this invention is to provide a system and apparatus for transmitting power from a prime mover to a load in which a high degree of efficiency of conversion and of transmission may be attained throughout the widely varying conditions imposed thereon by the characteristics of the load itself or by the characteristics of the prime mover. Another object is to provide a practical and simple apparatus for transmitting power from a prime mover to the driving wheels or axles of a vehicle, capable of reliable operation, of efficient action, and of meeting the characteristics of the prime mover itself in such a manner that a high degree of efficiency of conversion and transmission of energy may be dependably and consistently achieved. Another object is to provide an electrical system and apparatus for power transmission in which simplicity and ease of control may be achieved without the sacrifice of efficiency of operation or of simplicity of arrangement. Another object of this invention is to provide a system and apparatus of the above-mentioned nature by means of which a prime mover having such characteristics as are inherent in internal combustion engines may be utilized at a high degree of efficiency to meet the widely varying conditions of practical use such as in turn are inherent in the power requirements necessary to effect the driving of a vehicle. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing there is shown in the single figure and in diagrammatic form the apparatus and circuit arrangements illustrative of one of the various possible embodiments of this invention.

As conducive to a clearer understanding of certain features of this invention, it may at this point be noted that the conditions of speed and magnitude of load imposed upon a prime mover by a vehicle, such as a locomotive for example, are characterized by extremely wide variations and changes in character; there are many thoroughly practical advantages that reside in the utilization of a prime mover, such as an internal combustion engine intended to be supplied with gaseous or liquid fuel, such as gas or oil for example, and one of the dominant aims of this invention is to provide an apparatus and system by means of which such practical and highly desirable advantages may be effectively and efficiently achieved throughout the widely varying conditions of practical use.

Turning now to the drawing, there is shown at 10 a prime mover, preferably in the form of an internal combustion engine, adapted to be supplied with any suitable form of gaseous or liquid fuel for example, and from any convenient source. Thus, there is shown at 11 a conduit leading to the engine 10 and arranged in any suitable manner to supply the latter with an appropriate fuel, there being provided in the conduit 11 a throttle valve 12 arranged to be operated by the throttle or handle 13 so as to control at will the fuel supply to the prime mover 10. The engine 10 and its related apparatus may be mounted in any suitable manner upon the vehicle to be driven and, for the sake of simplicity of illustration, the latter is diagrammatically indicated in the drawing as including two pairs of wheels and associated axles 14 and 15.

The prime mover 10 drives, as through its driving shaft 16, a main generator A, the latter being provided with a field winding 17 to provide the armature 18 with an appropriate magnetic field, and suitably related to the main field winding 17 is a differential field winding 19. The generator A supplies energy to the driving motor or motors connected in any suitable manner to the driving wheel or axle of the vehicle. By way of illustration, I have shown two motors 20 and 21 connected in any suitable manner to the wheels and axles 14 and 15, respectively. The motors 20 and 21 may be of any suitable or appropriate form and, by way of further illustration, the motors 20 and 21 are indicated in the drawing as of the series type. The circuits of the motors 20 and 21 and the connection of the latter to the generator A may be effected in any suitable manner and by any suitable form of appropriate control or switching devices. For the sake of simplicity of illustration, the latter are not shown in the drawing, and the motors 20 and 21 are indicated as being directly connected to the generator A in order more clearly to illustrate the load circuit arrangement imposed upon the generator A.

The generator A may thus, when in operation, supply energy to the motors 20 and 21 through a circuit which may be traced as follows: from one terminal of the generator A, conductor 22, series winding 23 of motor 21, through the armature of the latter, thence by way of conductor 24 through the series field winding 25 of motor 20, thence through the armature of the latter, and by way of conductor 26 through the differential field winding 19 and back to the other terminal of the generator A.

The field winding 17 of generator A is preferably supplied with exciting current from a source distinct from the generator A and preferably from an exciter generator B of suitable capacity and preferably driven by the prime mover 10; thus the generator B may cenveniently be driven through the shaft 16 of the prime mover 10. At this point it might be noted that in systems and apparatus of this type various auxiliary translating devices need to be supplied with energy; for example, the vehicle or train may be provided with a series of lamps 27 for illumination purposes, a motor diagrammatically indicated at 28 may be necessary to drive an air compressor for the air brake system of the vehicle or train, and in order to supply current to the lamps 27 when the prime mover 10 is negative, as well as to supply energy to other devices, there is provided a storage battery 29. These various devices may be connected to a power circuit 30—31 and many, if not all, of these devices are of such character that they should be supplied with electrical energy at substantially constant voltage. I therefore preferably make the exciter generator B of sufficient capacity to supply the energy to such devices as are illustratively set forth above and therefore connect the power circuit 30—31 to the generator B. Conveniently, I include in this circuit a suitable form of automatic switch indicated at 32, this switch being arranged to effect the connection and disconnection of the generator B to the power circuit 30—31 in accordance with the activity or inactivity of the generator B, and hence of the prime mover 10.

The exciter generator B I have arranged to be controlled so that the voltage of its output will be maintained substantially constant irrespective of changes in speed imposed thereon by the prime mover 10 and, by way of illustration, I have inserted in circuit with the shunt field 33 of the generator B a variable resistance preferably taking the form of the carbon pile 34. A bell crank lever 35 pivoted as at 36 is arranged to have its one arm 37 operative upon the free or unanchored end of the carbon pile 34, a spring 38 being effective through the lever 35 to tend to compress the carbon pile 34. At an appropriate end of the lever 35 is connected the core 39 of a solenoid, the winding 40 of which is connected across the terminals of the generator B by means of conductors 41 and 42.

With this arrangement, the solenoid 39—40 will act to increase the resistance of the pile 34 should an increase in speed of the generator B increase the voltage of the output thereof and thus, by decreasing the excitation of the generator B, maintain the voltage at its desired value. A decrease in speed of the generator B will result in a reverse action on the part of the solenoid 39—40 and its related devices. Thus the auxiliary devices connected to the power circuit 30—31 may be dependably supplied with energy at substantially constant voltage so that these devices may operate at their intended efficiency and upon their intended characteristics; the particular advantage of this arrangement resides in the feasibility of maintaining the battery 29 charged while at the same time protecting it against overcharge, all in a simple but thoroughly dependable manner.

As above noted, the main field winding 17 of the generator A is supplied with exciting current from the exciter generator B; the circuit supplying exciting current to the field 17 will be seen to extend from one terminal of the generator B, then by way of conductor 41 to and through the field winding 17, thence by conductor 43 to one terminal or brush of the armature 44 of an auxiliary generator C, through the armature 44, and from the other brush or terminal of the generator C by way of conductor 45 back to the other terminal of the generator B. The armature 44 of the auxiliary generator C may be driven or rotated in any suitable manner, preferably by the prime mover or internal combustion engine 10. In the drawing it is diagrammatically indicated as directly connected to the shaft 16 of the prime mover 10. The generator C is provided with two field windings 46 and 47; the former is connected by conductors 48 and 49 directly across the terminals of the exciter generator B so as to be supplied therefrom at the substantially constant voltage of the generator B and to provide a substantially constant magnetic field. The other field winding 47 of the generator C is arranged to act in opposition to the field winding 46 and is connected by conductors 50 and 51 directly across the terminals of what I shall hereinafter term a regulating generator D. The latter is driven so as to be subject to the speed of the prime mover 10 and may conveniently be directly connected to the shaft 16 of the latter. The generator D may be of any suitable form and is preferably of the shunt-wound type; it is therefore provided with a shunt field winding 52 connected across the armature 53 of the generator D, but preferably through a resistance 54. From the resistance 54, conductors 55 and 56 lead respectively to one terminal of a variable resistance device 57 and to a contact member 58 coacting therewith and arranged to be moved upon the operation of the throttle or handle 13. In this manner the degree of excitation of the regulator generator D may be varied for a purpose to be more clearly described hereinafter.

Considering now the operation of the system and apparatus hereinbefore illustratively described, and assuming first that the load upon the motors 20 and 21 is substantially constant, the prime mover or internal combustion engine 10 will be operating at a speed and power output sufficient to cause the main generator A to supply energy to the motors 20 and 21 to carry the load thereon. Under these conditions, the exciter generator B will be supplying exciting current to the field winding 17 of the main generator A and, at the same time, may be supplying energy at substantially constant voltage to the power circuit 30—31. Under the above assumed conditions, the speed of the armature 53 of the regulating generator D will be sufficient to energize the field winding 47 of the auxiliary generator C so that the substantially constant magnetic field of the winding 46 is substantially neutralized, the net magneto-motive force within which the armature 44 of the auxiliary generator C rotates being thus substantially zero. The armature 44 will thus generate no voltage, and the flow of exciting current to the field winding 17 of the main generator A may continue undisturbed as long as the above assumed conditions continue.

Assuming, however, that the load on the motors 20—21 increases, for example because of the vehicle or train reaching an up-grade in its path of travel, the load upon the generator A will be increased and the resultant increase in load upon the internal combustion engine 10 will be to cause the speed of the latter to decrease. The further opening of the throttle valve 12, to increase the fuel supply to the engine 10 and thus to permit an increase in output of the engine 10, would thus find the engine 10 rotating at a speed decreasing in proportion with the increasing load and would give rise to the difficulty thus imposed upon the engine 10 to rapidly "pick up" in response to the increased fuel supply thereto, and this would happen at the exact moment when an increased output of the engine 10 is most desired. By means of the system and apparatus of my invention, however, I avoid the possibility of the above mentioned difficulty arising, this difficulty, if allowed to arise, being accompanied with the imposition upon the engine 10 of conditions of operation at which it must operate at greatly diminished efficiency when maximum efficiency is at that moment most desired.

As soon as the load on the motors 20—21 begins to increase, the increased current flowing through the differential field winding 19 diminishes to some extent the excitation of the generator A and brings about a corresponding diminution of output in the generator A; but the attendant decrease in speed of the engine 10 causes a like decrease in the speed of the armature 53 of the regulating generator D so that the exciting current supplied thereby to the field winding 47 of the auxiliary generator C is decreased, thus permitting the substantially constant field winding 46 to predominate, and thus causing the production in the armature 44 of a voltage which is in such a direction as to counteract the flow of exciting current to the main field winding 17 of the main generator A. Thus the excitation to the generator A is further diminished and its output decreased to such an extent that the speed of the engine 10 may at once partake of an increase substantially sufficient to bring its speed back to normal. At this moment the throttle valve 12 may be further opened to meet the demand of the greater load imposed upon the motor or motors supplied by the generator A, it being noted that the engine 10, in having its speed maintained against decrease, may thus promptly " pick up " and respond to the increased supply of fuel thereto, its output may correspondingly be increased and the output of the generator A correspondingly increased to carry the increased demands thereupon.

But the further opening of the valve 12 through the lever 13 increases the value of the resistance 57 shunted about the resistance 54 in circuit with the field 52 of the regulating generator D, thus commensurately diminishing the excitation of the regulating generator D and imposing thereupon conditions analogous to a decrease in speed of the armature 53 of the generator D. The field 46 of the auxiliary generator C is thus made to preponderate again, the resultant voltage generated by the armature 44 thereof causing a sufficient diminution in the excitation supplied to the field winding 17 that the output of the generator A is decreased sufficiently to permit the engine 10 to further increase its speed and, in effect, to achieve a new or higher standard of speed sufficient to cause the armature 53 of the regulating generator D to neutralize, through the field winding 47, the field 46 of the generator C. At this new standard of speed of the engine 10, it may continue to operate at an increased output commensurate with the increased fuel supply, and in this manner the desired speed-power output characteristic of the internal combustion engine 10 may be closely approached if not entirely achieved, and a high degree of efficiency effectively maintained.

Such a maintenance of the new standard of operation of the system and apparatus is insured by the action of the regulating generator D for, should the speed of rotation of its armature, driven by the prime mover 10, increase to such a value that its output is sufficient to make the field winding 47 preponderant over the field winding 46 of the auxiliary generator C, then the voltage produced by the armature 44 of the latter generator will be in a direction to assist the voltage of the exciter generator B and thus materially increase the excitation supplied to the field winding 17 of the main generator A. The output of the latter is thereby at once increased, and the speed of the engine 10 thus, because of the increased load thereon, brought back to normal or to this new standard set by the control lever 13.

I prefer to utilize the differential field winding 19 to affect the output of the generator A as hereinbefore described by way of example, inasmuch as the action of this differential field brings about such a coaction with the controlling and regulating devices and apparatuses that the capacity or range of action of certain of the latter may be made less, though thoroughly practical and highly desirable advantages may be achieved even though the differential field winding 19 is omitted.

It will thus be seen that there has been provided in this invention a system and apparatus for the transmission of power in which the several objects hereinbefore noted, as well as many thoroughly practical advantages, are successfully achieved; it will be seen that the system and apparatus effectively safeguards the internal combustion engine against having imposed upon it a condition by reason of which its prompt response to the control lever or throttle and its intended efficiency of operation are impaired. It will be seen, moreover, that the transmission provided by this invention insures automatically the proper conditioning of the internal combustion engine to respond promptly and at high efficiency to an increased fuel supply thereto, and that the characteristic of maximum efficiency of operation of the internal combustion engine may be made to be realized in practice throughout the widely varying load conditions imposed upon the apparatus. It will moreover be seen that there has been provided a system and apparatus well adapted to meet effectively and efficiently the varying conditions of hard practical use.

Certain broader features of the arrangement herein disclosed are claimed in my co-pending application Serial No. 22377, filed April 11, 1925.

As many possible embodiments might be made of the above invention and as many changes might be made in the embodiment above set forth, it is to be understood that all matter herein described or shown in the accompanying drawing is to be interpreted as illustrative and not in a limiting sense.

I claim as my invention:

1. In apparatus of the character described, in combination, an internal combustion engine, a generator driven thereby, means forming an electrical load for receiving energy from said generator, means for supplying excitation current to said generator comprising two sources of electromotive force, means for controlling the power output of said engine, and means responsive to the operation of said control means for affecting one of said sources of electromotive force.

2. In apparatus of the character described, in combination, an internal combustion engine, a generator driven thereby, means forming an electrical load for receiving energy from said generator, means for supplying excitation current to said generator comprising two sources of electromotive force, means for controlling the power output of said engine, and means controlled by said engine for causing the electromotive force of one of said sources to be additive or subtractive with respect to the electromotive force of the other of said sources in accordance with the speed of said engine.

3. In apparatus of the character described, in combination, a prime mover; a generator driven thereby, said generator having exciting means; means forming an electrical load for receiving energy from said generator; means for supplying excitation current to the exciting means of said generator; and means for regulating the said excitation current, said means comprising a source of electromotive force, means causing the voltage of said source to vary substantially in accordance with the speed of said prime mover, and means connecting said source to be effective in the exciting circuit of said generator.

4. In apparatus of the character described, in combination, an internal combustion engine, a generator driven thereby, means forming an electrical load for receiving energy from said generator, means for supplying excitation current to said generator, an auxiliary generator connected in the excitation circuit of said main generator, and means for causing the voltage of said auxiliary generator, upon a decrease in speed of said engine, to be in a direction to oppose the flow of excitation current to said main generator and upon an increase in the speed of said engine to be effective in a direction to increase the excitation current supplied to said main generator.

5. In apparatus of the character described, in combination, an internal combustion engine, means for controlling the power output of said engine, a generator driven thereby, means forming an electrical load for receiving energy from said generator, an auxiliary generator in the excitation circuit of said main generator and provided with two exciting fields, and means causing one or the other of said exciting fields to preponderate in accordance with an increase or decrease in the load on said engine for a given setting of said controlling means.

6. In apparatus of the character described, in combination, an internal combustion engine, a generator driven thereby, means forming an electrical load for receiving energy from said generator, an auxiliary generator in the excitation circuit of said main generator and provided with two exciting fields, means for applying one of said fields with a substantially constant exciting current, and means for supplying the other of said fields with an excitation current adapted to vary in accordance with an increase or decrease in the speed of said engine.

7. In apparatus of the character described, in combination, an internal combustion engine, a generator driven thereby, means forming an electrical load for receiving energy from said generator, an auxiliary generator for controlling the excitation of said main generator and provided with two exciting fields, means causing one or the other of said exciting fields to preponderate in accordance with an increase or decrease in the load on said engine for a given power output thereof, and means adapted to change the standard of operation of said auxiliary generator.

8. In apparatus of the character described, in combination, an internal combustion engine, a generator driven thereby, means forming an electrical load for receiving energy from said generator, an auxiliary generator for controlling the excitation of said main generator and provided with two exciting fields, means causing one or the other of said exciting fields to preponderate in accordance with an increase or decrease in the speed of said engine, means for controlling the power output of said engine, and means for changing, in response to the operation of said last-mentioned means, the standard of operation of said auxiliary generator.

9. In apparatus of the character described, in combination, an internal combustion engine, a generator driven thereby, means forming an electrical load for receiving energy from said generator, an auxiliary generator in the excitation circuit of said main generator and provided with two exciting fields, means for supplying one of said fields with a substantially constant exciting current, means for supplying the other of said fields with an excitation current adapted to vary in accordance with an increase or decrease in the speed of said engine, means for controlling the power output of said engine, and means responsive to the operation of said last-mentioned means adapted to change the standard of operation of one of said means for supplying said fields with excitation current.

10. In apparatus of the character described, in combination, an internal combustion engine, a generator driven thereby, means forming an electrical load for receiving energy from said generator, means forming an auxiliary electrical load, an exciter for supplying excitation current to said generator and adapted to supply energy to said auxiliary load circuit, means for maintaining the output of said exciter at substantially constant voltage, and means for regulating the supply of excitation current from said exciter to said main generator comprising a source of electromotive force interposed between said exciter and the field of said main generator, said source being so related to said engine that its voltage will vary in substantial accordance with the speed of said engine.

11. In apparatus of the character described, in combination, a vehicle carrying a prime mover and a generator driven thereby, said generator having an excited excitation circuit, a motor for driving said vehicle and supplied with energy from said generator, and means adapted, upon an increase in the load on said prime mover tending to decrease the speed thereof, to cut down the output of said generator comprising a source of voltage in the excitation circuit of said generator.

12. In apparatus of the character described, in combination, a vehicle carrying a prime mover, and a generator driven thereby, said generator having an excited excitation circuit, a motor for driving said vehicle and supplied with energy from said generator, means for controlling the excitation of said generator comprising a source of voltage in the excitation circuit of said generator, and means adapted upon an increase in the load on said motor tending to reduce the speed of said prime mover to cause said source of voltage to become effective to reduce the excitation of said generator.

13. In apparatus of the character described, in combination, a vehicle carrying a prime mover and a generator driven thereby, said generator having an excited excitation circuit, a motor for driving said vehicle and supplies with energy from said generator, and means for maintaining the speed of said prime mover substantially constant comprising a normally ineffective source of voltage in the excitation circuit of said generator and means adapted upon a decrease in the speed of said prime mover to cause said source of voltage to become effective in a direction to decrease the excitation of said generator and upon an increase in the speed of said prime mover to become effective in a direction to increase the excitation of said generator.

14. In apparatus of the character described, in combination, a vehicle carrying a prime mover and a generator driven thereby, said generator having an excited excitation circuit, a motor for driving said vehicle and supplied with energy from said generator, means for maintaining the speed of said prime mover substantially constant comprising a normally ineffective source of voltage in the excitation circuit of said generator and means adapted upon a decrease in the speed of said prime mover to cause said source of voltage to become effective in a direction to decrease the excitation of said generator and upon an increase in the speed of said prime mover to become effective in a direction to increase the excitation of said generator, means for controlling the power output of said prime mover, and means responsive to the operation of said controlling means adapted to change the standard of operation of said source of voltage.

15. In apparatus of the character described, in combination, a vehicle carrying an internal combustion engine, a generator driven thereby, a motor for driving said vehicle and supplied with energy from said generator, a normally ineffective source of voltage arranged to become effective upon a change in speed of said engine, and means responsive to effective condition of said source of voltage for affecting the speed of said engine.

16. In apparatus of the character described, in combination, a vehicle carrying an internal combustion engine, a generator driven thereby, a motor for driving said vehicle and supplied with energy from said generator, a normally ineffective source of voltage arranged upon an increase in the speed of said engine to produce a voltage in one direction and upon a decrease in speed of said engine to produce a voltage in opposite direction, means responsive to the voltage of said source for affecting the speed of said engine, and means for changing the standard of operation of said source of voltage.

17. In apparatus of the character described, in combination, a prime mover and a load driven therefrom, a normally ineffective source of voltage means for making said source effective upon a change in speed of said prime mover, and means responsive to said source of voltage when effective for controlling the speed of said prime mover.

18. In apparatus of the character described, in combination, a prime mover, a load driven therefrom, power transmission means interposed therebetween, means adapted for a predetermined power output of said prime mover to prevent said transmission means, upon an increase in said load, from increasing the load on said prime mover, and means for controlling the operation of said last-mentioned means including a normally ineffective source of voltage but effective upon an increase in said load.

19. In apparatus of the character described, in combination, a prime mover, a load driven therefrom, power transmission means interposed therebetween, a normally ineffective source of voltage producing a voltage in one direction upon an increase in the speed of said prime mover and producing a voltage in another direction upon a decrease in the speed of said prime mover, and means responsive to the voltages of said source when effective for changing the power transmitted by said transmission means.

20. In apparatus of the character described, in combination, an internal combustion engine having a power output-speed characteristic such that a change in its power output is accompanied by a change in its speed, a load adapted to be supplied with energy from said engine, variable power transmission means interposed between said engine and said load, means for controlling said transmission means for maintaining the speed of said engine substantially constant and including a normally ineffective source of electromotive force made effective upon a change in speed of said engine, means for changing the power output of said engine to permit the supply of a different amount of energy thereby to said load, and means for changing the standard of operation of said transmission controlling means to cause the latter to maintain substantial speed constancy of said engine at a different speed.

21. In apparatus of the character described, in combination, an internal combustion engine having a power output-speed characteristic such that a change in its power output is accompanied by a change in its speed, a load adapted to be supplied with energy from said engine, variable power transmission means interposed between said engine and said load, means for controlling said transmission means for maintaining the speed of said engine substantially constant and including a normally ineffective source of electromotive force made effective upon a change in speed of said engine, means for changing the power output of said engine to permit the supply of a different amount of energy thereby to said load, and means responsive to the operation of said last-mentioned means for changing the standard of operation of said transmission controlling means to cause the latter to transmit a different amount of energy to said load and to maintain substantial speed constancy of said engine at a different speed.

22. In apparatus of the character described, in combination, an internal combustion engine having a power output-speed characteristic such that a change in its power output is accompanied by a change in its speed, a load adapted to be supplied with energy from said engine, variable power transmission means interposed between said engine and said load, a source of variable voltage for controlling the energy transmitted by said power transmission means, means for controlling said source of voltage to maintain substantially constant the energy supplied said load at a given speed of said engine, and means for changing the standard of operation of said last-mentioned means to maintain substantial constancy of energy supplied said load at a different speed of said engine.

In testimony whereof, I have signed my name to this specification this eighth day of April, 1925.

ALAN VARLEY LIVINGSTON.